Feb. 24, 1970 R. E. SCHUIL 3,497,458
EUROPIUM ACTIVATED LANTHANUM-INDIUM OXIDE PHOSPHOR
Filed July 28, 1967
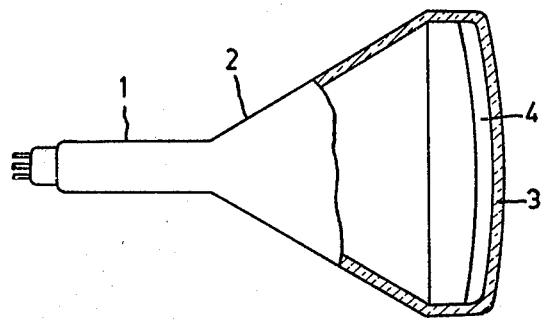
INVENTOR.
ROELOF E. SCHUIL
BY
AGENT 3,497,458
EUROPIUM ACTIVATED LANTHANUM-INDIUM OXIDE PHOSPHOR
Roelof Egbert Schuil, Eindhoven, Netherlands, assignor, by mesne assignments, to U.S. Philips Corporation, New York, N.Y., a corporation of Delaware
Filed July 28, 1967, Ser. No. 656,822
Claims priority, application Netherlands, Aug. 2, 1966, 6610829
Int. Cl. C09k $1/10$
U.S. Cl. 252—301.4      4 Claims

ABSTRACT OF THE DISCLOSURE

Red phosphor comprising an oxide of lanthanum and indium corresponding to the formula $(La_xIn_y)_2O_3$ activated with trivalent europium. The phosphor is useful in gas discharge tubes and as the red component in color television receiver picture tubes.

---

The invention in this case relates to a novel red luminescent phosphor, to the production of such a phosphor and to a color television picture tube having a luminescent screen containing such a phosphor.

In many recent publications, luminescent substances have been described which contain as an activator one or more of the rare earth metals particularly trivalent europium. Special attention has been paid to luminescent substances which exhibit a red emission upon excitation by electrons or by ultraviolet radiation. Such substances are of great importance for use in color television display tubes and to improve the color rendition of gas discharge lamps, more particularly high-pressure mercury vapor discharge lamps. The investigations have especially been concerned with the efficiency of the luminescent substances, the location of the maximum emission in the emission spectrum and a satisfactory temperature dependence. The term "efficiency of the substances" is used herein to signify the ratio between the radiation energy emitted by the luminescent substances and the energy in the radiation by which the luminescent substances are excited. As to the location of the maximum in the emitted radiation, it should be noted that attempts are made to obtain luminescent substances for use in cathode-ray tubes for color television applications of which the maximum in the emission is located so that the color point to be attained with this substance in the triangle of colors fixed by international agreement has the coordinates $x=0.66$ and $y=0.34$. These coordinates have been internationally agreed upon for the red color of a color television display screen.

It has been found that various compounds containing trivalent europium as an activator satisfy these requirements to a great extent. However, these materials are rather expensive usually and frequently show an undesirable alkaline reaction.

According to my invention I have prepared a novel trivalent europium activated phosphor comprising an oxide of lanthanum and indium and corresponding to the formula $(La_xIn_y)_2O_3$, the ratio of $x$ to $y$ being between 1:0.7 and 1:1.1.

The quantity of europium is preferably so large that the ratio between the number of europium atoms and the sum of the number of indium and lanthanum atoms lies between 0.005 and 0.15.

The indium-lanthanum oxide phosphor is a red luminescing substance, the efficiency and the color of its luminescent light being similar to those of the known red luminescing gadolinium oxide activated with trivalent europium. As compared with gadolinium oxide, the red component of a screen according to the invention has the great advantage of being much cheaper. Moreover, its application involves less difficulty than that of gadolinium oxide, since this substance, in contradistinction to gadolinium oxide, does not produce an alkaline reaction. This is of special importance for the use in a screen for color display tubes in which, as is known, a photosensitive binder is employed which is mixed with bichromate. Due to the alkaline reaction of the gadolinium oxide, the bichromate is readily converted to chromate which does not produce the desired reaction in the photochemical hardening process. With respect to gadolinium oxide, the red component according to the invention further has the advantage of its white body color. As a result, a color shift which occurs if a television display screen is struck by incident light is avoided. For the gadolinium oxide has a light-yellow color and reflects mainly the yellow component from the incident white light. Thus, the red luminescent color observed by the spectator shifts towards orange.

With respect to the yttrium vanadate activated with trivalent europium, which is also known, the same advantages are obtained except for the advantage of the non-alkaline reaction for yttrium vanadate does not produce an alkaline reaction either.

The red emission of the lanthanum-indium oxide activated with trivalent europium exhibits a maximum lying at approximately 614 nm. If the europium content in the aforesaid range is chosen to be comparatively high, i.e. between 0.04 and 0.08, the emission is concentrated substantially completely in the said range. This is very desirable for an optimum color reproduction, especially in color television.

Since europium is a very expensive element, a reduction of the europium content in the substance would be very advantageous. It has been found that the europium content of the red component according to the invention can be reduced without any objection, although the red emission then shifts slightly farther to the orange due to the occurrence of small emission peaks between 580 and 610 nm. This slightly less red emission has the advantage, however, that the brightness increases. The europium content must then lie between 0.01 and 0.04.

My invention will now be described with reference to the following examples and drawing:

EXAMPLE 1

2.9 gm. of $La_2O_3$
2.8 gm. of $In_2O_3$
0.35 g. of $Eu_2O_3$ are mixed and heated for 1 to 3 hours in air at a temperature lying between 800° C. and 1600° C. The reaction product is ground and is then ready for use. Upon excitation by electrons, the efficiency is 4.5 to 5.0%.

EXAMPLE 2

3.12 g. of $La(NO_3)_3$
3.01 g. of $In(NO_3)_3$
0.14 g. of $Eu(NO_3)_3$ are dissolved in water and to this solution is added a solution of oxalates, peroxalates, carbonates or hydroxides of, for example, the alkali metals. A deposit is then formed of the corresponding compounds of lanthanum, indium and europium. This deposit is filtered off or centrifuged and dried. The dry substance is then heated for 1 to 3 hours at a temperature lying between 800° C. and 1600° C. The reaction product is ground and is then ready for use. Upon excitation by electrons, an efficiency is measured of approximately 5.0%.

In the drawing, the sole figure shows, partly in section, a cathode-ray tube employing the red luminescent component of the invention. The tube consists of a cylindrical part 1 and a frustoconical part 2. The part 2 is closed at one end with a face plate 3 of glass which is covered on its interior side with a luminescent screen 4. This screen consists of an array of regularly placed dots which emit, upon electron excitation, one of the colors green, blue or red. The red luminescing dots consists of a phosphor prepared according to Example 1. The luminescing dots may be bound to the glass plate by means of a binder e.g. a polyvinyl alcohol hardened by ultraviolet radiation.

What I claim is:

1. A red luminescent phosphor consisting essentially of an oxide of the formula $(La_x In_y)_2O_3$ activated with trivalent europium, the ratio of $y$ to $x$ being between 0.7 and 1.1 and wherein $x+y=1$.

2. The red luminescent phosphor of claim 1 wherein the ratio of the number of europium atoms to the sum of $x+y$ lies between 0.005 and 0.15.

3. The red luminescent phosphor of claim 1 wherein the ratio of the number of europium atoms to the sum of $x+y$ lies between 0.04 and 0.08.

4. The red luminescent phosphor of claim 1 wherein the ratio of the number of europium atoms to the sum of $x+y$ lies between 0.01 and 0.04.

References Cited

UNITED STATES PATENTS 3,322,682   5/1967   Thompson _____ 252—301.4

HELEN M. McCARTHY, Primary Examiner

R. D. EDMONDS, Assistant Examiner